(12) United States Patent
Ezequiel

(10) Patent No.: US 9,386,143 B2
(45) Date of Patent: Jul. 5, 2016

(54) CALL LOG FOR A HAND HELD COMMUNICATION DEVICE SIMULTANEOUSLY DISPLAYING MOST FREQUENT AND MOST RECENT COMMUNICATIONS

(71) Applicant: Saronikos Trading and Services, Unipessoal Lda, Funchal, Madeira (PT)

(72) Inventor: Ruiz Rodriguez Ezequiel, Panama (PA)

(73) Assignee: Saronikos Trading and Services, Unipessoal Lda, Funchal, Madeira (PT)

( * ) Notice: Subject to any disclaimer, the term of this patent is extended or adjusted under 35 U.S.C. 154(b) by 0 days.

(21) Appl. No.: 14/439,865

(22) PCT Filed: Oct. 30, 2012

(86) PCT No.: PCT/EP2012/071485
§ 371 (c)(1),
(2) Date: Apr. 30, 2015

(87) PCT Pub. No.: WO2014/067560
PCT Pub. Date: May 8, 2014

(65) Prior Publication Data
US 2015/0271319 A1    Sep. 24, 2015

(51) Int. Cl.
*H04M 3/42* (2006.01)
*H04M 1/725* (2006.01)
(Continued)

(52) U.S. Cl.
CPC .... *H04M 1/72586* (2013.01); *H04M 1/274583* (2013.01); *H04M 3/2218* (2013.01); *H04W 8/183* (2013.01)

(58) Field of Classification Search
None
See application file for complete search history.

(56) References Cited

U.S. PATENT DOCUMENTS

| 2003/0225879 A1 | 12/2003 | Chipehase |
| 2005/0182798 A1 | 8/2005 | Todd et al. |

(Continued)

FOREIGN PATENT DOCUMENTS

| EP | 2 023 582 | 2/2009 |
| GB | 2 471 329 | 12/2010 |

OTHER PUBLICATIONS

International Search Report for Application No. PCT/EP2012/071485 dated Jul. 15, 2013.

*Primary Examiner* — Erika A Washington
(74) *Attorney, Agent, or Firm* — Frommer Lawrence & Haug LLP

(57) ABSTRACT

A hand-held communication device including a display. A plurality of communication incidents of the communication device is logged. A recent-communication-incident log is determined, which includes information regarding the most recent communication incidents. A most-frequent-communication-incident log is determined, which includes information regarding the sender or receiver of the most-frequent communication incidents. A combined-communication log is generated, which includes a portion of items relating to the recent-communication-incident log and a portion of items relating to the most-frequent-communication-incident log. A first or second number of items of the combined-communication log corresponds to the first N items of the recent-communication-incident log, and a second or first number of items of the combined-communication log corresponds to the first M items of the most-frequent-communication-incident log. The combined-communication log is displayed on the display, enabling a user of the communication device to select an item from the combined-communication log to initiate a communication.

11 Claims, 2 Drawing Sheets

(51) Int. Cl.
*H04M 1/2745* (2006.01)
*H04M 3/22* (2006.01)
*H04W 8/18* (2009.01)

(56) References Cited

U.S. PATENT DOCUMENTS

2006/0035632 A1 2/2006 Sorvari et al.
2009/0239499 A1* 9/2009 Wang ............... H04M 1/72552 455/405
2011/0200182 A1 8/2011 Kodama et al.
2011/0231425 A1* 9/2011 de Leon ............ H04M 1/72552 707/769
2011/0250873 A1 10/2011 Bocking et al.
2011/0287745 A1 11/2011 Alwan et al.

* cited by examiner

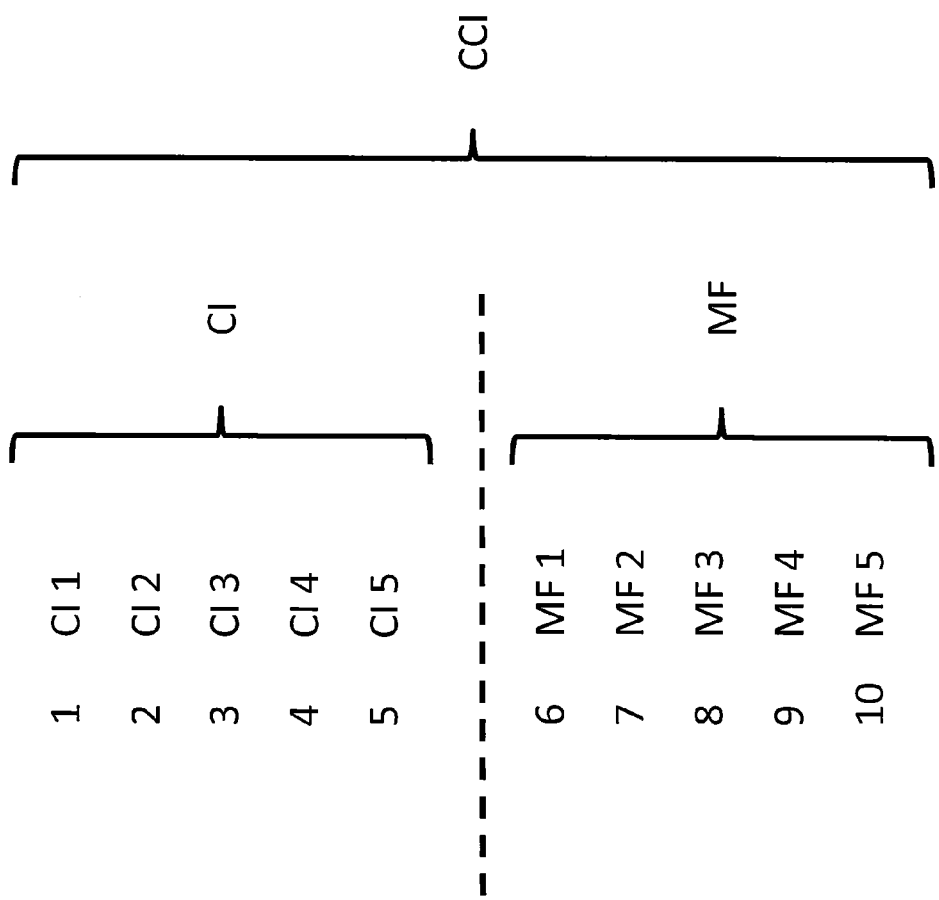

CALL LOG FOR A HAND HELD COMMUNICATION DEVICE SIMULTANEOUSLY DISPLAYING MOST FREQUENT AND MOST RECENT COMMUNICATIONS

The present application claims priority from PCT Patent Application No. PCT/EP2012/071485 filed on Oct. 30, 2012, the disclosure of which is incorporated herein by reference in its entirety.

FIELD OF THE INVENTION

The invention relates to a method of implementing a call log for a hand held communication device as well as to a hand held communication device.

It is noted that citation or identification of any document in this application is not an admission that such document is available as prior art to the present invention.

Call logs are well known for hand held communication devices such as mobile phone or smart phones. Typically, the call log is a list of the most recently called telephone numbers or the most recent dialled numbers. It has to be noted that the call log feature is known in the hand held communication devices for more than 30 years. Some examples of these call log features are.

US 2011/0287745 A1 discloses a method of implementing a call log in a mobile device. Communication incidents to and from the mobile device are logged. Furthermore, context incidents like no reception are also logged. Context incidents are associated with the communication incidents. A call log window is generated to display a list with the communication incidents together with the context incidents.

US 2011/0250873 A1 shows a hand held device and a method of providing an improved call log. Call related information is accessed from a memory. A log of phone calls is complied including the call related information. For each number with call related information stored in the memory only the most recent in time call is listed on the call log. The call log comprises a list of the most recent phone calls.

US 2011/0200182 A1 discloses a method of generating a call log. The call log comprises the most recent dialled numbers or the most recent received numbers as well as contact information such as the contact name, if such contact information is stored on the communication device. The call log comprises a sub list with communication details (missed call, SMS etc) associated to the contact names.

In other words, since long time (more than 30 years) call logs for hand held communication devices are known, but none of them gives to the user the possibility to select one of the phone numbers called in the past by a quick and smart overview of the numbers dialled; of course these phone numbers have been previously memorized on the hand held communication device and organized on the basis of their history and therefore some of them are more likely to be called in the next future call.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

It is an object to provide a method of implementing a call log for a hand held communication device as well as hand held communication device which allows a more efficient way to quickly retrieve contact details to initiate a communication.

Accordingly, a method of implementing a communication log for a hand held communication device is provided. The hand held communication device comprises a transceiver for wireless communication, a central processing unit and a display. A plurality of communication incidents of the communication device is logged. A recent communication incident log is determined. The recent communication incident log comprises information regarding the most recent communication incidents of the communication device. A most frequent communication incident log is determined, wherein the most frequent communication incident log comprises information regarding the sender or receiver of the most frequent communication incidents. A combined communication log is generated. The combined communication log comprises a portion of items relating to the recent communication incident log and a portion of items relating to the most frequent communication incident log. A first or second number of items of the combined communication log corresponds to the first N items of the recent communication incident log and a second or first number of items of the combined communication log corresponds to the first M items of the most frequent communication incident log. The combined communication log is displayed on the display enabling a user of the communication device to select an item from the combined communication log to initiate a communication based on the selected communication incident.

The generated combined communication log comprising a sequence of items from the recent communication incident log and from the most frequent communication incident log can be stored in a memory of the hand held communication device. The combined communication log is a merger or combination of the most recent communication incidents and the most frequent communication incidents such that items from the most frequent communication incident log and items from the most recent communication incident log are combined into a new list or log.

According to an aspect of the invention, each communication incident can comprise information regarding a sender or recipient of the communication, a unique communication identifier, the kind of communication, the date, the time and/or duration of the communication.

According to a further aspect of the invention, the communication device comprises a contact list having a plurality of names each associated to a unique communication identifier. The combined communication log comprises names from the contact list if their corresponding unique communication identifier is associated to one of the communication incidents.

According to a further aspect of the invention, a third number of subsequent items of the combined communication log corresponds to the third subsequent items of a favourite list generated by the user comprising a number of items of the contact list.

According to a further aspect of the invention, the combined communication log is displayed in a window or portion of the display.

According to a further aspect of the invention, the first N items of the combined communication log are displayed in a first window or portion of the display and the second M items of the combined communication log are displayed in a second window or portion of the display.

According to a further aspect of the invention, the first and the most recent item in the recent communication incident log is placed on the first place of the combined communication log. The item having the highest number of incidents in the most frequent communication incident log is placed on the second place of the combined communication log.

According to a further aspect of the invention, the item having the second highest numbers of incidents in the most frequent communication incident log is placed at least on the third place on the combined communication log.

The invention also relates to a hand held communication device comprising a transceiver for wireless communication, a central processing unit and a display wherein the hand held device is adapted to perform the above described method.

The invention also relates to a hand held communication device comprising a transceiver for wireless communication, a central processing unit, a display, a communication log unit for logging a plurality of communication incidents of the communication device, for determining a recent communication incident log comprising information regarding the most recent communication incidents of the communication device, for determining a most frequent communication incident log comprising information regarding the sender or receiver of the most frequent communication incidents and for generating a combined communication log comprising a portion of items relating to the recent communication incident log and a portion of items relating to the most frequent communication incident log. The first or second number of the items of the combined communication log corresponds to the first N items of the recent communication incident log. A second number M or a first number N of the items of the combined communication log corresponds to the first M items of the most frequent communication incident log. The combined communication log is displayed on the display enabling a user of the communication device to select an item from the combined communication log to initiate a communication based on the selected communication incident.

According to an aspect of the invention, the hand held communication device comprises at least one memory for storing the items of the combined communication log.

The invention relates to the idea that typically a person with which a user would like to communicate with a) is a person from which the user most recently received a communication (list of incoming calls, missed calls), b) is a person that the user tried to communicate with recently (dialled calls), or c) is a person with whom the user most frequently communicates (list of most frequent communications). To enable a more efficient communication log, a list of the most recent calls/communications is combined with a list of the most frequently communicated persons or identifiers. E.g. in the resultant list, the first numbers or portion of entries are reserved for the most recent communications. Then the second number or portion of entries is reserved for the most frequent communications. The order of the two portions can be inverted, displaying first the portion of entries reserved for the most frequent communications and displaying second the portion of entries reserved for the most recent communications.

According to the invention, a communication log is provided in form of at least one list which contains entries from a communication log relating to the most recent communication incident of the hand held communication device and entries from a list relating to the identifier with which the hand held device has communicated most frequently in the past. In addition or alternatively, the communication log may also comprise entries relating to a favourite list O as selected by the user.

The communication log can be displayed on a display of the hand held device.

With the communication log according to the invention, the probability will be high that a user will find the person or identifier with which he would like to communicate in this communication log as it is a combination of the list of names or identifiers with which the user most frequently communicates and a list of recent communication incidents (like missed calls or dialled telephone numbers).

Communication identifiers are defined as unique elements able to refer to one single contact. Identifiers can be: telephone numbers, entries in the hand held communication device contact list, email addresses, aliases or identifiers in social networks (e.g. facebook, twitter, google+, ... ), identifiers used in online portals, instant communication tools (e.g. skype, whatsapp, viber, ICQ, messenger, ... ).

BRIEF DESCRIPTION OF THE DRAWINGS

FIG. 2 shows a schematic representation of a communication log according to a second embodiment.

DETAILED DESCRIPTION OF EMBODIMENTS

Figure 1:
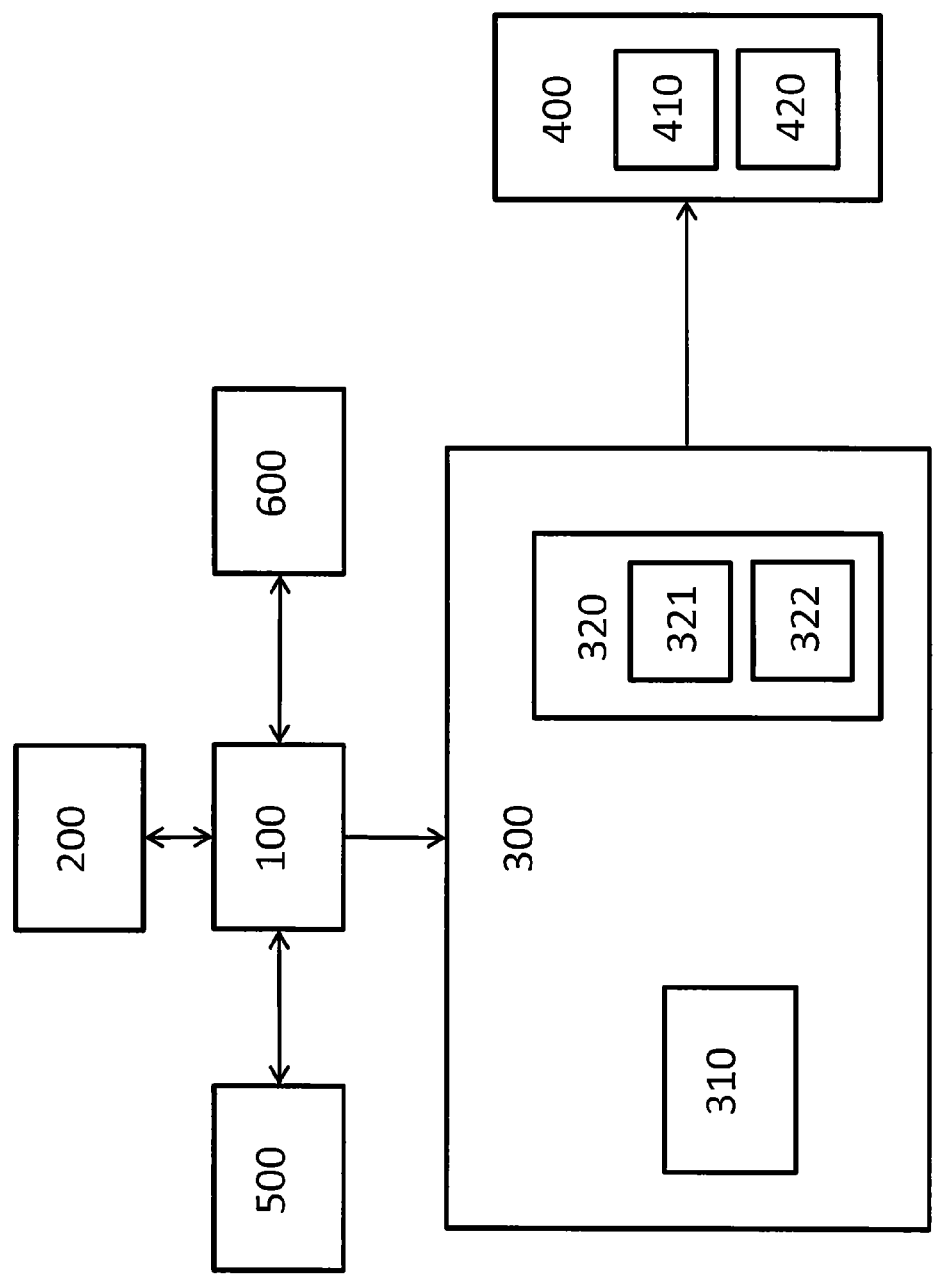
FIG. 1 shows a schematic block diagram of a hand held communication device according to a first embodiment.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows a schematic block diagram of a hand held communication device according to a first embodiment. The hand held communication device comprises a central processing unit 100, a transceiver 200, a display managing unit 300, a display 400 and a memory 500. The communication device optionally comprises a windows managing unit 310 and a communication log unit 320. The communication log unit 320 can comprise a most frequent communication incident unit 321 and a recent communication incident unit 322.

The central processing unit 100 is used to run an operating system of the communication device. The operation system is an interface between the hardware of the device and an application running on the communication device. The central processing unit 100 is used for managing and coordinating activities and resources of the device. The transceiver 200 is used to receive and transmit data. The transceiver can be used for any wireless communication. The wireless communication can be based on a Wi-Fi protocol, a 3G protocol, a 4G protocol like LTE etc.

The display 400 is used to display information. The display managing unit 310 serves to control the display 400. The display can be used as a graphic interface unit GUI. The device 400 can furthermore comprise a keyboard 410 and/or a touch screen 420. Alternatively, the keyboard and/or the touch screen can be implemented separate from the display.

Optionally, the windows managing unit 310 is provided which serves to control windows or portions of the display 400. The windows managing unit 310 can also be used to manage different parts or portions of the display 400.

The communication log unit 320 monitors the communication incidents of the hand held device. Communication incidents can be sent and received e-mails, sent and received text messages, dialled and received phone calls, dialled and received video calls, sent or received messages, sent or received messages from social media applications. A communication log unit 320 can comprise a most frequent communication incident unit 321 for monitoring the communication incidents of the hand held device and for determining the most frequent communications incident list MF from/to other users. In addition, the communication log unit 320 comprises a recent communication incident unit 322 for monitoring and logging the most recent communication incidents of the hand held device.

According to the first embodiment, the communication log unit 320 is adapted to generate a combined communication log CCI based on the most frequent communication incident list MF from the most frequent communication unit 321 and the recent communication incident list CI from the recent communication incident unit 321. The combined communication incident log list CII comprises a first number N of items from the recent communication incident list CI and a second number M of items from the most frequent communication incident list MF. According to the first embodiment, the first items of the combined communication log list CCI correspond to the most recent communication incidents from the recent communication incident list CI. Thereafter, the next items of the combined list CCI correspond to the first items in the most frequent communication incident list MF. Alternatively, the sequence can be vice versa.

The windows managing unit 320 can edit the combined communication incident list CCI such that the list can be displayed on a window or part of the display. Alternatively, the windows managing unit 310 can be adapted to edit the combined communication incident list CCI such that the combined communication incident list is displayed on two separate windows or on two separate portions of the display. In this case, the first window or portion can be used for displaying the selected items from the recent communication incident list CI and the second window or second portion of the display 400 can be used to display the selected items from the most frequent communication incidents MF.

According to an aspect of the first embodiment, the windows managing unit 310 can display the recent communication incident list CI in the first window or portion of the display and the most frequent communication incident list MF in the second window or portion of the display 400.

The windows managing unit 310 can be adapted to select different colours for the items from the recent communication incident list CI and the items from the most frequent communication incident list MF.

The hand held device can furthermore optionally comprise a contact list unit 600. The contact list unit serves to create and manage a contact list which can be optionally stored on the hand held device. The contact list will comprise a plurality of names and a unique identifier (e. g. in form of a telephone number, an associated e-mail address, an associated social media profile etc.) associated to each name. Typically, the contact list will comprise a name that is associated to the unique identifier. It is clear that the contact list can be managed in the same manner as described above with reference to the log of calls. It is also clear that the content of all the above said lists is updated every time the user makes a phone call or contacts somebody.

FIG. 2 shows a schematic representation of a communication log according to a second embodiment. The windows managing unit 310 according to the first embodiment can be adapted to provide a combined communication log list CCI as described according to the first embodiment. As an example, the first number N (e. g. 5) of items in the combined communication log list CCI correspond to the first N items from the recent communication incident list CI and the subsequent second number M of items of the combined communication incident list CCI correspond to the first numbers M from the most frequent communication incident list MF. Alternatively, the sequence can be reversed, i.e. the first items are the M items from the most frequent communication incident list MF and the subsequent items are the first N items of the most recent communication incident list CI.

One preferred embodiment of the present invention can be the most effective one in the case of displaying on the hand held communication device a single and continuous list of calls/contacts. In this case on the top of the list is placed the last call or contact (communication incident) made by the user, taking it from the recent communication incident list CI. This because it is very convenient to have as the first phone number or contact available the last phone number or contact in the case when the last call failed or was interrupted before the end. This allows the user to call again the previous person or contact, without doing a complicated search in the calls log. The second or subsequent places on the list can be taken by the phone numbers or contacts that have the highest ranks in the most frequent communication incident list MF. This is useful because in the situation when the user wants to call or contact somebody who is not the same person called in the previous call, the probability that he/she calls one of the contacts in the most frequent communication incident list MF is very high. In this way, apart the last call or contact, the user has available in easy way the number of his/her parents, or people working with him/her that are of course put in order of frequency of calls. Obviously in this case also the third, the fourth, etc. phone numbers or contact taken by the most frequent communication incident list MF.

What is clear from the above description is that the data relating to the calls/contacts are displayed in a mix or combined manner, taking the data both from the most frequent communication incident list MF and the recent communication incident list CI, putting at least as the first one of the list, the last phone/contact made by the user.

According to a further embodiment which can be based on any of the previous embodiments, the combined communication log (with its sequence of items) is stored for example in the memory 500. In other words, the combined communication log CCI for example as depicted in FIG. 2 is stored with the described sequence of items in the memory. It should, however, be noted that any other above described sequence of items of the combined communication log CCI can also be stored in its particular sequence in the memory. Once the sequence of items of the combined communication log CCI is stored in the memory, the combined communication list can be easily read out of the memory and displayed accordingly on the hand held device.

At the happening of a new communication incident, the sequence of items stored in the memory relating to the most frequent communication incident and in the memory relating to the recent communication incident is amended reflecting the fact that a new communication incident has occurred. As a result the most frequent communication incident list MF, the recent communication incident list CI and the combined communication incident list CCI displayed to the user differ, reflecting the changes in the sequence of items stored in the memory.

A hand held communication device can be implemented as a mobile phone, a smart phone, a tablet computer, a notebook computer etc.

The memory 500 can be used by the communication log unit 320 for storing the most frequent communication incident list MF and/or the recent communication incident list CI as well as the combined communication incident list CCI. Alternatively, the communication log unit 320 can comprise a dedicated memory for storing the respective list.

Optionally, the hand held device can comprise a voice activating unit which can be used instead of the keyboard 410 and/or the touch screen 420 to input commands into the hand held device.

The hand held device may comprise a graphics user interface GUI which can be implemented by the central processing unit 110 or alternatively the screen managing unit 300. Alternatively, the graphic user interface can also be implemented by a dedicated graphics user interface unit.

The communication log unit 320 can optionally also be able to control meta data of the most frequent communication incident list MF and/or the recent communication incident list CI. For example, the communication log unit 320 can associate different colours to the items of the most frequent communication incident list MF and the recent communication incident list CI. As an example, the items of the recent communication incident list CI can be displayed in blue while the items of the most frequent communication incident list MF can be displayed in green. Optionally, the user can choose the colour of the items from the respective lists MF, CI.

The present invention is advantageous as it allows an easy and efficient way for the user to access the contact or communication details of those persons with which the user will wish to communication with a certain probability.

In the prior art documents, merely a call log is generated which is based on the most recent communication incidents like missed calls, dialled phone numbers etc.

It is clear that in the present description when is mentioned a communication incident, this means in general term both the incoming and outgoing call/contact, even if the invention can be embodied only with reference to the outgoing calls/contacts.

Not only the communication incidents are used as items in the communication log, but also those communication incidents that are used as items of the communication log which relate to the most frequent communication incidents.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of implementing a communication log for a hand-held communication device having a transceiver for a wireless communication, a central processing unit, and a display, said method comprising the steps of:
   logging a plurality of communication incidents of the communication device;
   determining a recent-communication-incident log comprising information regarding the most recent communication incidents of the communication device;
   determining a most-frequent-communication-incident log comprising information regarding the sender or receiver of the most frequent communication incidents;
   generating a combined-communication log comprising:
      a portion of items relating to the recent-communication-incident log; and
      a portion of items relating to the most-frequent-communication-incident log;
      wherein a first number (N) or second number (M) of items on the combined-communication log correspond to the first N items of the recent-communication-incident log; and
      wherein a second number (M) or first number (N) of items of the combined-communication log correspond to the first M items of the most-frequent-communication-incident log; and
   displaying the combined-communication log on the display so as to enable a user of the communication device to select a communication incident from the combined-communication log to initiate a communication based on the selected communication incident;
   wherein the first and the most recent item of the recent-communication-incident log is placed on the first place of the combined-communication log; and
   wherein an item having the highest number of incidents in the most-frequent-communication-incident log is placed on the second place on the combined-communication log.

2. The method according to claim 1;
   wherein each communication incident comprises:
      information regarding a sender or recipient of the communication;
      a unique communication identifier;
      the kind of communication; and
      the date, time, and/or duration of the communication.

3. The method according to claim 2;
   wherein the communication device comprises a contact list having a plurality of names, each name being associated to a unique communication identifier; and
   wherein the combined-communication log comprises names from the contact list that have a corresponding unique communication identifier that is associated to one of the communication incidents.

4. The method according to claim 3;
   wherein a third number of subsequent items on the combined-communication log correspond to the third subsequent items of a favorite list generated by the user comprising a number of items of the contact list.

5. The method according to claim 2;
   wherein the combined-communication log is displayed in a window or portion of the display.

6. The method according to claim 2;
   wherein the first N items of the combined-communication log are displayed in a first window or portion of the display and the second M items of the combined-communication log are displayed in a second window or portion of the display.

7. The method according to claim 1;
wherein an item having the second highest number of incidents in the most frequent communication incident log is placed at least on the third place on the combined-communication log.

8. A hand-held communication device comprising:
a transceiver for a wireless communication;
a central processing unit; and
a display;
wherein the hand held device is adapted to perform the method of claim 1.

9. The method according to claim 1;
wherein different colors are associated to items of the most-frequent-communication-incident log and to items of the recent-communication-incident log.

10. A hand-held communication device comprising:
a transceiver for a wireless communication;
a central processing unit;
a display; and
a communication log unit configured to:
   log a plurality of communication incidents of the communication device;
   determine a recent-communication-incident log comprising information regarding the most recent communication incidents of the communication device;
   determine a most-frequent-communication-incident log comprising information regarding a sender or receiver of the most-frequent communication incidents; and
   generate a combined-communication log comprising a portion of items relating to the recent-communication-incident log and a portion of items relating to the most-frequent-communication-incident log;
wherein the first number (N) or second number (M) of the items of the combined-communication log corresponds to the first N items of the recent-communication-incident log;
wherein a second number (M) or a first number (N) of the items of the combined-communication log correspond to the first M items of the most-frequent-communication-incident log;
wherein the hand-held communication device is configured to display the combined-communication log on the display so as to enable a user of the communication device to select a communication incident from the combined-communication log to initiate a communication based on the selected communication incident;
wherein the first and the most recent item of the recent-communication-incident log is placed on the first place of the combined-communication log; and
wherein an item having the highest number of incidents in the most-frequent-communication-incident log is placed on the second place on the combined-communication log.

11. The hand-held communication device according to claim 10, further comprising:
at least one memory configured to store the items of the combined communication log.

* * * * *